Patented Dec. 27, 1927.

1,653,959

UNITED STATES PATENT OFFICE.

ADOLF GRÜN AND RICHARD LIMPÄCHER, OF SCHRECKENSTEIN, NEAR AUSSIG, CZECHO-SLOVAKIA, ASSIGNORS TO THE FIRM: GEORG SCHICHT A.-G. AUSSIG.

PROCESS FOR THE PREPARATION OF PHOSPHATIDES.

No Drawing. Application filed September 23, 1924, Serial No. 739,407, and in Czechoslovakia September 27, 1923.

The direct synthesis of phosphatides (in the widest sense mixed-acid esters of phosphoric acid with a neutral alcohol and a basic alcohol) from its components has not hitherto been accomplished. Hundeshagen endeavoured to effect the synthesis of a phosphatide, distearyl-lecithin, by first preparing the phosphoric-acid ester of distearin and letting the second component, the choline, act on this compound. In that case however the amino-alcohol reacted only with its basic hydroxyl group, while the alcoholic hydroxyl group did not react at all; hence what was produced was not the choline ester of distearin phosphoric-acid ester but the isomeric choline salt. (J. f. pr. Ch. (II.) 28,219; 1882). Later on Grün and Kade suggested esterifying diglyceride phosphoric acid with one component of choline, ethyleneglycol or its chlorhydrin instead of with choline and of then converting the ester thus obtained into a lecithin by introduction of trimethyl amine. (German Patent No. 240,075). This synthesis is however cumbrous and the yields are unsatisfactory. Now it has been found that the phosphatides may be prepared directly from their components by allowing phosphorus pentoxide to react with one molecule of the neutral alcohol and two molecules of the amino-alcohol or two molecules of a suitable salt of the amino-alcohol. Phosphorus pentoxide gives, with the equimolecular mixture of an alcohol, an intermediate product, the mono-alkyl-ester of anhydro-pyro-phosphoric acid, $H_2P_2O_6$, or alkyl meta-phosphate and meta-phosphoric acid, and this intermediate product can react with two molecules of amino-alcohol in such a way that both the basic and the alcoholic hydroxyl groups are saturated. In practice a salt of the amino-alcohol is employed; the acid thereof is driven out more or less completely during the reaction according to its strength. In this way one necessarily obtains a molecule of mixed-acid ester, viz: alkyl-amino-alkyl phosphoric acid ester (phosphatide) and one molecule of a simpler ester, viz: amino-alkyl phosphoric acid ester. The two esters can easily be separated from one another on the basis of their different solubilities in different solvents such as benzol or petroleum ether, and then by neutralizing the simple amino-alkyl-phosphoric acid ester (which is titrated against phenolphthalein as a mono-basic acid, while the mixed-acid ester is neutral to phenolphthalein).

The reaction may be varied in manifold ways, on the one hand in the carrying out of it, as for example by transposing the order of the steps according to which the two alcohols are caused to react, or by the choice of different salts of amino-alcohol (for example a salt of an inorganic or of an organic acid, carbonate, bicarbonate, fatty acid salt, and so forth), or on the other hand the alcohols capable of being employed for the reaction permit of a very great variation. If one employs as a neutral alcohol a diglyceride, and as an amino-alcohol choline, one obtains as the main product a lecithin and as a by-product choline phosphoric acid ester, which in its turn serves again as the raw material for the synthesis of lecithin. If one selects as a neutral alcohol a diglyceride, and as a basic alcohol colamine, one obtains a kephaline. Instead of a diglyceride any other neutral alcohol can of course be used, and instead of choline or colamine, any other basic alcohol. The reaction is on this account also excellently adapted for the preparation of lipotropic medicines, or for the preparation of lipotropic derivatives of known medicaments. As a basic alcohol, adrenaline may for example be employed, or some other ammonium base of analogous structure, or an arsonium base, and so forth; a neutral alcohol component of definite therapeutic effect may be introduced; lecithins or kephalines may also be prepared in the diglyceride components of which one fatty acid radicle or both fatty acid radicles are replaced by the radicles of acids of definite therapeutic effect, as for instance those of monoiodobehenic acid, of chlorarsinobehenolic acid, and so forth.

*Example.*

Into the melt of 100 parts of distearin are stirred 23 parts of phosphorus pentoxide. After a few minutes 54 parts of choline bicarbonate are added and stirred and kneaded energetically until the mixture solidifies. It is taken up in hot benzol and filtered from the choline phosphate that has remained undissolved. The filtrate is neutralized, for example by means of alcoholic alkali metal hydroxide, the solution is concentrated, or allowed to crystallize out directly with cooling, or precipitated with a medium that does not dissolve lecithin such as acetone. The reaction product separated in this way or otherwise mostly contains a small percentage of choline sodium phosphate. For the removal of this the substance is taken up in the quantity of benzol that is just necessary and alcohol is added, whereupon some sodium phosphate first separates out. After this is removed the solution is allowed to cool and the lecithin crystallizes out. The product is then practically pure, and almost completely neutral; any further purification, as by dissolving in benzol and precipitating with acetone and so forth, is usually unnecessary.

In the same manner as choline or choline carbonate, other amino-alcohols or other salts of choline and of other amino-alcohols such as colamine, adrenaline and so forth can obviously also be caused to react; especially also anhydrous forms of the type of choline sulphate anhydride or of the analogous carbonate:

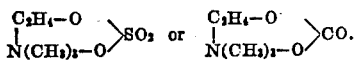

The term "diglyceride" in the claims is to be taken as embracing mixtures of diglycerides such as technical diglycerides and also diglycerides mixed with triglycerides or neutral fats.

What we claim is:—

1. A process for the preparation of phosphatides comprising reacting phosphorous pentoxide with an aliphatic organic compound containing an alcoholic hydroxyl and an aliphatic organic compound containing an alcoholic hydroxyl and an amino-nitrogen.

2. A process for the preparation of phosphatides comprising reacting phosphorous pentoxide with an aliphatic organic compound containing an alcoholic hydroxyl and an aliphatic hydroxy ethyl ammonium compound.

3. A process for the preparation of phosphatides comprising reacting one molecule of phosphorous pentoxide with a molecule of an aliphatic organic compound containing alcoholic hydroxyl and with two molecules of an aliphatic organic compound containing an hydroxyl group and an amino-nitrogen.

4. A process for the preparation of phosphatides comprising reacting phosphorous pentoxide with a diglyceride and with an aliphatic organic compound containing an hydroxyl group and an amino-nitrogen.

5. A process for the preparation of phosphatides comprising reacting phosphorous pentoxide with a diglyceride and with an aliphatic hydroxy ethyl-ammonium compound.

6. A process for the preparation of phosphatides, comprising reacting phosphorous pentoxide with a therapeutically active aliphatic organic compound containing an alcoholic hydroxyl group and with an aliphatic organic compound containing an hydroxyl group and an amino-nitrogen.

7. A process for the preparation of phosphatides, comprising reacting phosphorous pentoxide with a diglyceride which contains a radical of a therapeutically active acid and with an aliphatic organic compound containing an hydroxyl group and an amino-nitrogen.

8. A process for the preparation of phosphatides, comprising reacting phosphorous pentoxide with a diglyceride of a therapeutically active acid and with an aliphatic organic compound containing an hydoxyl group and an amino-nitrogen.

9. A process for the preparation of phosphatides, comprising reacting phosphorous pentoxide with an aliphatic organic compound containing an alcoholic hydroxyl and an aliphatic hydroxy ethyl alkyl ammonium compound.

10. A process for the preparation of phosphatides, comprising reacting phosphorous pentoxide with an aliphatic organic compound containing an alcoholic hydroxyl group and with an aliphatic hydroxy ethyl-trimethyl ammonium compound.

11. A process for the preparation of phosphatides, comprising reacting phosphorous pentoxide with an aliphatic organic compound containing an alcoholic hydroxyl group and with an hydroxy ethyl-trimethyl ammonium carbonate.

12. A process for the preparation of phosphatides, comprising reacting phosphorous pentoxide with an aliphatic organic compound containing an alcoholic hydroxyl and an aliphatic organic compound containing an hydroxyl and an amino-nitrogen in presence of fats.

13. A process for the preparation of phosphatides, comprising reacting phosphorous pentoxide with an aliphatic hydroxy ethyl-ammonium compound and with solution of diglyceride in triglycerides.

14. A process for the preparation of phosphatides, comprising reacting phosphorous pentoxide with an aliphatic hydroxy ethyl-ammonium compound and with a solution of diglyceride in fats.

In testimony whereof we affix our signatures.

DR. ADOLF GRÜN.
RICHARD LIMPÄCHER.